(12) United States Patent
Lin et al.

(10) Patent No.: US 10,717,939 B2
(45) Date of Patent: Jul. 21, 2020

(54) DESULFURIZATION CATALYST FOR HYDROCARBON OILS, ITS PREPARATION, AND USE THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Wei Lin, Beijing (CN); Ye Song, Beijing (CN); Huiping Tian, Beijing (CN); Lei Wang, Beijing (CN); Jun Liu, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 175 days.

(21) Appl. No.: 15/789,813

(22) Filed: Oct. 20, 2017

(65) Prior Publication Data
US 2018/0112139 A1 Apr. 26, 2018

(30) Foreign Application Priority Data
Oct. 21, 2016 (CN) .......................... 2016 1 0920325

(51) Int. Cl.
*C10G 45/46* (2006.01)
*B01J 35/00* (2006.01)
(Continued)

(52) U.S. Cl.
CPC .............. *C10G 45/46* (2013.01); *B01J 23/06* (2013.01); *B01J 23/22* (2013.01); *B01J 23/28* (2013.01);
(Continued)

(58) Field of Classification Search
CPC ... B01J 23/06; B01J 23/22; B01J 23/28; B01J 23/755; B01J 35/002; B01J 27/22;
(Continued)

(56) References Cited

U.S. PATENT DOCUMENTS 2,326,585 A * 8/1943 Vesterdal .................. C07C 2/58
585/730
3,291,854 A * 12/1966 Laimonis .................. C07C 5/56
585/620
(Continued)

FOREIGN PATENT DOCUMENTS

CN      1355727 A    6/2002
CN      1382071 A   11/2002
(Continued)

OTHER PUBLICATIONS

Patrick Rodriguez et al., "Comparison of vanadium carbide and nitride catalysts for hydrotreating." Catalysis Communications 5, pp. 79-82. (Year: 2004).*

(Continued)

*Primary Examiner* — Patricia L. Hailey
(74) *Attorney, Agent, or Firm* — Novick, Kim & Lee, PLLC; Allen Xue

(57) ABSTRACT

Disclosed is a desulfurization catalyst for hydrocarbon oils, comprising a support and at least one metal promoter selected from the group consisting of cobalt, nickel, iron and manganese, the support comprising at least one metal oxide selected from the group consisting of oxides of Group IIB, Group VB and Group VIB metals and a refractory inorganic (Continued)

oxide, wherein the support further comprises at least about 5% by weight of vanadium carbide, based on the total weight of the desulfurization catalyst for hydrocarbon oils. The desulfurization catalyst for hydrocarbon oils shows a good stability, a high desulfurization activity, an excellent abrasion resistance, and a long service life. Also disclosed is a process for preparing the desulfurization catalyst for hydrocarbon oils, and use of the catalyst in the desulfurization of sulfur-containing hydrocarbon oils.

18 Claims, 2 Drawing Sheets

(51) Int. Cl.
*B01J 23/755* (2006.01)
*B01J 23/06* (2006.01)
*B01J 23/22* (2006.01)
*B01J 23/28* (2006.01)
*C01G 31/00* (2006.01)
*B01J 27/22* (2006.01)
*C01G 9/02* (2006.01)
*C01G 39/02* (2006.01)
*G01N 23/20* (2018.01)

(52) U.S. Cl.
CPC .......... *B01J 23/755* (2013.01); *B01J 35/002* (2013.01); *C01G 31/00* (2013.01); *B01J 27/22* (2013.01); *C01G 9/02* (2013.01); *C01G 39/02* (2013.01); *G01N 23/20075* (2013.01)

(58) Field of Classification Search
CPC ........ C10G 45/06; C10G 45/08; C10G 45/46; C10G 45/50; C01G 9/02; C01G 39/02; G01N 23/20075
USPC .............. 502/324, 325, 307, 308, 312, 177; 208/208 R, 209, 213, 216 R, 217
See application file for complete search history.

(56) References Cited

U.S. PATENT DOCUMENTS

| 4,672,016 | A | * | 6/1987 | Isoda | ................... | G03G 9/1136 |
| | | | | | | 428/407 |
| 5,451,389 | A | * | 9/1995 | Sherif | ...................... | B01J 27/22 |
| | | | | | | 423/439 |
| 6,150,300 | A | | 11/2000 | Khare et al. | | |
| 2010/0310941 | A1 | * | 12/2010 | Kumta | ..................... | H01B 1/04 |
| | | | | | | 429/231.95 |
| 2013/0045865 | A1 | * | 2/2013 | Thompson | ............... | B01J 37/08 |
| | | | | | | 502/177 |

FOREIGN PATENT DOCUMENTS

| CN | 1422177 | A | | 6/2003 | | |
| CN | 1488712 | A | | 4/2004 | | |
| CN | 1627988 | A | | 6/2005 | | |
| CN | 1856359 | A | | 11/2006 | | |
| CN | 1871063 | A | | 11/2006 | | |
| CN | 101774593 | A | | 7/2010 | | |
| CN | 102294223 | A | | 12/2011 | | |
| CN | 103372416 | A | | 10/2013 | | |
| CN | 10 5289683 | | * | 2/2016 | ............. | B01J 27/24 |
| CN | 10 5289701 | | * | 2/2016 | ............. | B01J 29/06 |
| CN | 10 5289706 | | * | 2/2016 | ............. | B01J 29/46 |
| CN | 105289682 | A | | 2/2016 | | |
| CN | 10 7970961 | | * | 5/2018 | ............. | B01J 27/22 |
| CN | 10 7970962 | | * | 5/2018 | ............. | B01J 27/22 |
| CN | 10 7970963 | | * | 5/2018 | ............. | B01J 27/22 |
| CN | 10 7970968 | | * | 5/2018 | ............. | B01J 29/06 |
| CN | 10 7970977 | | * | 5/2018 | ............. | B01J 29/16 |
| CN | 10 7970994 | | * | 5/2018 | ............. | B01J 27/22 |
| CN | 10 7971030 | | * | 5/2018 | ............. | B01J 29/85 |
| CN | 10 7971033 | | * | 5/2018 | ............. | B01J 29/85 |
| JP | 55-097253 | A | | 7/1980 | | |

OTHER PUBLICATIONS

Yan Li, "Preparation of carbide-metal composite powders and their materials by direct reduction carbonization". Jan. 2008., Wuhan University of Technology.

* cited by examiner

DESULFURIZATION CATALYST FOR HYDROCARBON OILS, ITS PREPARATION, AND USE THEREOF

TECHNICAL FIELD

The present invention relates to the field of desulfurization of hydrocarbon oils, and particularly to a desulfurization catalyst for hydrocarbon oils, its preparation, and use thereof.

BACKGROUND ART

With the increasing importance attached to environmental protection, the environmental laws are becoming more and more stringent, where reducing the sulfur content of gasoline and diesel oil is deemed as one of the most important means to improve the air quality. Most of the sulfur in gasoline products comes from the thermal processed gasoline blending components, such as catalytic cracking gasoline. Therefore, the reduction of sulfur content in thermal processed gasoline is favorable to the reduction of sulfur content in gasoline products. The current gasoline product standard of China, GB 17930-2016, "Gasoline for motor vehicles", requires the sulfur content in gasoline products to be no more than 50 µg/g. And, the quality standard for gasoline products will become more stringent in the future. Under such circumstances, catalytic cracking gasoline has to be subjected to a deep desulfurization, so as to make the gasoline product conformable to the environmental protection requirement.

Currently, there are two primary processes for the deep desulfurization of oil products, i.e., selectively catalytic hydrodesulfurization and catalytic hydrogenation adsorption desulfurization. In the catalytic hydrogenation adsorption desulfurization process, sulfides in hydrocarbon oils are removed via adsorption at a certain temperature and pressure in the presence of hydrogen. This process has the characteristics of low hydrogen consumption and low requirement on the purity of hydrogen, such that it has extensive potential applications in the desulfurization of fuel oils.

CN1355727A discloses an adsorbent composition useful for removing sulfur from cracking gasoline and diesel fuel, consisting of zinc oxide, silica, alumina and nickel, wherein the nickel is present substantially in reduced state in an amount capable of removing sulfur from the cracking gasoline or diesel fuel stream in contact with the nickel-containing adsorbent composition under desulfurization conditions. The composition is obtained by granulating a mixture of zinc oxide, silica and alumina to form particles, drying, calcinating, followed by impregnation with nickel or a nickel-containing compound, drying and calcinating again, and then reducing.

CN1382071A discloses an adsorbent composition useful for removing sulfur from cracking gasoline and diesel fuel, consisting of zinc oxide, silica, alumina and cobalt, wherein the cobalt is present substantially in reduced state in an amount capable of removing sulfur from the cracking gasoline or diesel fuel stream in contact with the cobalt-containing adsorbent composition under desulfurization conditions.

U.S. Pat. No. 6,150,300 discloses a process for preparing an adsorbent, comprising the following steps for preparing spherical particles: (a) mixing a composition comprising silica, a composition comprising a metal oxide dispersed in an aqueous media and a composition comprising zinc oxide to form a first mixture without extruding the first mixture; and (b) spheroidizing the first mixture to produce particles having diameters of 10-1000 mm. Step (a) may further comprise mixing with a metal promoter.

CN1422177A discloses an adsorbent composition useful for removing sulfur from cracking gasoline and diesel fuel, consisting of zinc oxide, expanded perlite, alumina and a metal promoter, wherein the metal promoter is present substantially in reduced state in an amount capable of removing sulfur from the cracking gasoline or diesel fuel stream in contact with the composition under desulfurization conditions.

CN1627988A discloses an adsorbent composition useful for removing elemental sulfur and sulfur compounds from cracking gasoline and diesel fuel, comprising zinc oxide, expanded perlite, aluminate and a metal promoter, wherein the metal promoter is present in an amount capable of removing sulfur from the cracking gasoline or diesel fuel stream in contact with the composition under desulfurization conditions, and at least a part of the metal promoter is present in zero valence state.

CN1856359A discloses a process for producing a composition, comprising the steps of: a) mixing a liquid, a zinc-containing compound, a silica-containing material, alumina and a co-catalyst, to form a mixture; b) drying the mixture, to form a dried mixture; c) calcinating the dried mixture, to form a calcinated mixture; d) reducing the calcinated mixture with a suitable reducing agent under appropriate conditions, to produce a composition comprising a co-catalyst content in reduced state, and e) recovering the composition. The co-catalyst comprises a plurality of metals selected from the group consisting of nickel and the like.

CN1871063A discloses a process for producing a composition, comprising the steps of: a) mixing a liquid, a zinc-containing compound, a silica-containing material, and alumina, to form a mixture; b) drying the mixture, to form a first dried mixture; c) calcinating the first dried mixture, to form a first calcinated mixture; d) incorporating a promoter into or onto the first calcinated mixture, to form a promoted mixture; e) contacting the promoted mixture with an acid selected from the group consisting of citric acid, tartaric acid and combinations thereof, to form a contacted mixture; f) drying the contacted mixture, to form a second dried mixture; g) calcinating the second dried mixture, to form a second calcinated mixture; h) reducing the second calcinated mixture under appropriate conditions using a suitable reducing agent, to produce a composition comprising a promoter content in reduced state, and i) recovering the composition.

Though the adsorbents disclosed have certain desulfurization capability, the requirement on the sulfur content of gasoline products is becoming more and more stringent as the quality standard for gasoline increases. Moreover, such kind of catalysts are susceptible to abrasion during use, which requires continuous replenishment of the catalyst, and thus increases the operation cost. It thus can be seen that new catalysts with higher desulfurization activity and abrasion resistance are still needed.

SUMMARY OF THE INVENTION

The object of the present invention is to provide a desulfurization catalyst for hydrocarbon oils that can overcome the defects of prior adsorbents including low desulfurization activity, low structure stability and poor abrasion resistance, a process for preparing the catalyst, and use thereof To accomplish the above object, the present invention provides in an aspect a desulfurization catalyst for hydrocarbon oils, comprising a support and at least one metal promoter selected from the group consisting of cobalt, nickel, iron and manganese, the support comprising at least one metal oxide selected from the group consisting of oxides of Group IIB, Group VB and Group VIB metals and a refractory inorganic oxide, wherein the support further comprises at least about 5% by weight of vanadium carbide, based on the total weight of the desulfurization catalyst for hydrocarbon oils.

In another aspect, the present invention provides a process for preparing a desulfurization catalyst for hydrocarbon oils, comprising the steps of:

(i) preparing a support comprising at least one metal oxide selected from the group consisting of oxides of Group IIB, Group VB and Group VIB metals, a refractory inorganic oxide and vanadium carbide, and (ii) loading on the support at least one metal promoter selected from the group consisting of cobalt, nickel, iron and manganese, wherein the desulfurization catalyst for hydrocarbon oils comprises at least about 5% by weight of vanadium carbide, based on the total weight of the desulfurization catalyst.

In a further aspect, the present invention provides a desulfurization catalyst for hydrocarbon oils produced by the process for preparing a desulfurization catalyst for hydrocarbon oils according to the present invention.

In a still further aspect, the present invention provides use of the desulfurization catalyst for hydrocarbon oils according to the present invention in the desulfurization of sulfur-containing hydrocarbon oils.

The desulfurization catalyst for hydrocarbon oils according to the present invention can provide at least one of the following benefits:

The desulfurization catalyst for hydrocarbon oils according to the present invention comprises chemically stable vanadium carbide (VC), so that the interaction with metal oxides including zinc oxide and the like can be reduced, and the formation of zinc silicate and the like can thus be avoided. For example, as shown in FIG. 1, the XRD spectrum obtained after hydrothermal aging of the hydrocarbon oil desulfurization catalyst A1 produced in Example 1 does not show any characteristic peak of zinc silicate.

The desulfurization catalyst for hydrocarbon oils according to the present invention exhibits improved stability and higher desulfurization activity, and thus the sulfur in a hydrocarbon oil can be adsorbed more effectively onto the desulfurization catalyst for hydrocarbon oils during the desulfurization of the hydrocarbon oil, so that a hydrocarbon oil with lowered sulfur content can be obtained. Moreover, the desulfurization catalyst for hydrocarbon oils provided in the present invention has improved resistance to abrasion, resulting in reduced catalyst dissipation during the desulfurization, and thus has a prolonged service life.

The desulfurization catalyst for hydrocarbon oils according to the present invention further possesses a certain dehydrogenation activity, and thus is capable of promoting, among others, the dehydrogenation and aromatization reactions of cycloalkanes present in hydrocarbon oils, resulting in the generation of hydrogen and high-octane components. Accordingly, the consumption of extrinsic hydrogen in the desulfurization process can be reduced, the operation cost can be lowered, and the quality of the desulfurized gasoline thus obtained can be improved.

Other characteristics and benefits of the present invention will be illustrated in more detail below in the Detailed Description section.

BRIEF DESCRIPTION OF THE DRAWINGS

The drawings are provided to help further understand the present invention and compose a part of the specification, which are used together with the following embodiments to illustrate the present invention, without making any limitation thereto. In the figures.

DETAILED DESCRIPTION OF THE EMBODIMENTS

Figure 1:
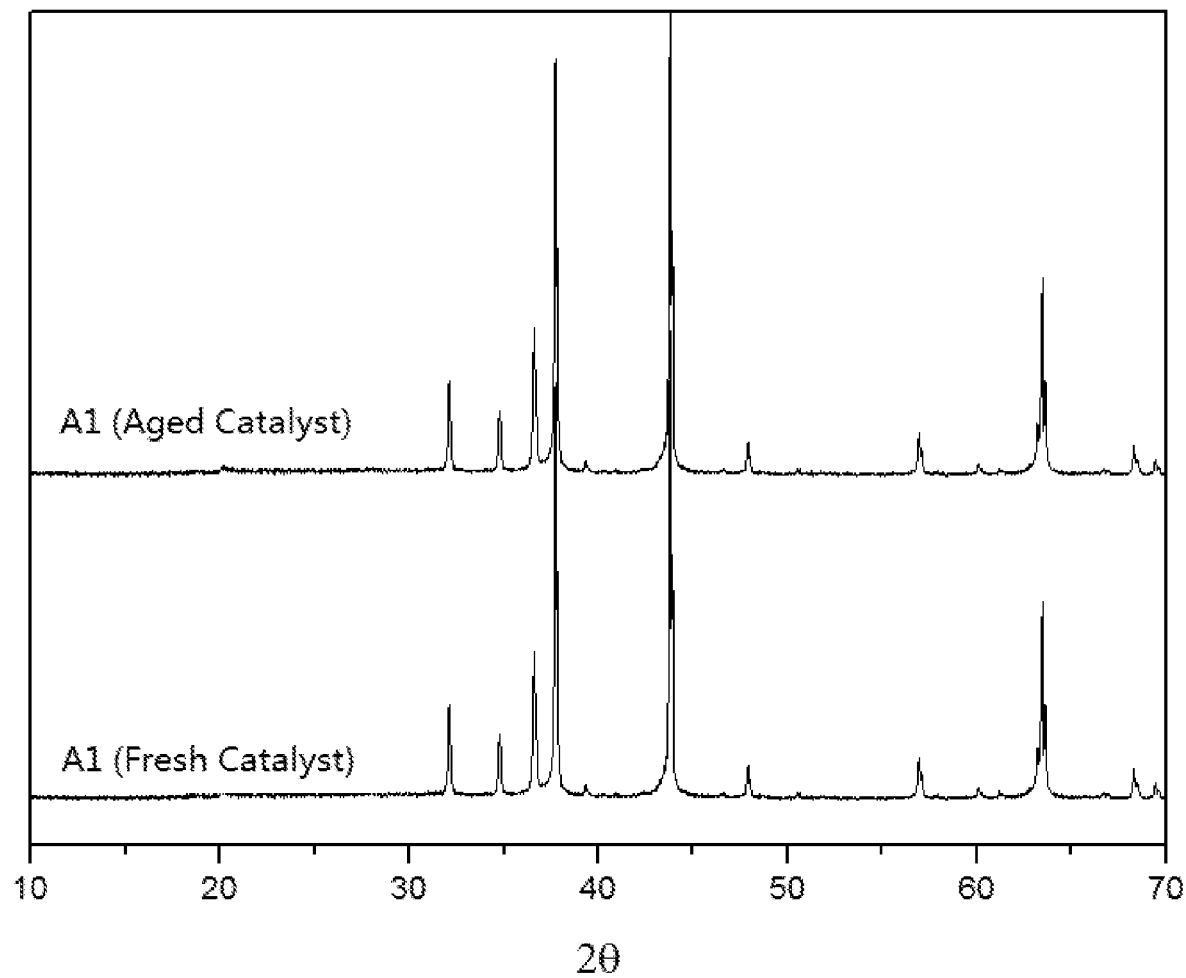
FIG. 1 shows XRD spectrums obtained before and after hydrothermal aging of the hydrocarbon oil desulfurization catalyst A1 produced in Example 1.

Some embodiments of the present invention will be illustrated in more detail hereinbelow. It should be understood that the embodiments described herein are merely used to illustrate and explain the present invention, without making any limitation thereto.

Any specific numerical value, including the endpoints of a numerical range, described in the context of the present application is not restricted to the exact value thereof, but should be interpreted to further encompass all values close to said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

In a first aspect, the present invention provides a desulfurization catalyst for hydrocarbon oils, comprising a support and at least one metal promoter selected from the group consisting of cobalt, nickel, iron and manganese, the support comprising at least one metal oxide selected from the group consisting of oxides of Group IIB, Group VB and Group VIB metals and a refractory inorganic oxide, wherein the support further comprises at least about 5% by weight of vanadium carbide, based on the total weight of the desulfurization catalyst for hydrocarbon oils.

In a preferred embodiment, the desulfurization catalyst for hydrocarbon oils is substantially free of silica. As used herein, the term "substantially free of" means that, based on the total weight of the desulfurization catalyst for hydrocarbon oils, the silica is present in an amount of not more than about 5% by weight, preferably not more than about 1% by weight, more preferably not more than about 0.5% by weight.

In a preferred embodiment, based on the total weight of the desulfurization catalyst for hydrocarbon oils, the desulfurization catalyst comprises or consists of the components of: 1) about 10-80% by weight of the metal oxide; 2) about 3-35% by weight of the refractory inorganic oxide; 3) about 5-40% by weight of vanadium carbide; and 4) about 5-30% by weight of the metal promoter.

In a more preferred embodiment, based on the total weight of the desulfurization catalyst for hydrocarbon oils, the desulfurization catalyst comprises or consists of the components of: 1) about 25-70% by weight of the metal oxide, 2) about 6-25% by weight of the refractory inorganic oxide, 3) about 10-30% by weight of vanadium carbide, and 4) about 8-25% by weight of the metal promoter.

In a still further preferred embodiment, based on the total weight of the desulfurization catalyst for hydrocarbon oils, the desulfurization catalyst comprises or consists of the components of: 1) about 40-60% by weight of the metal oxide, 2) about 8-15% by weight of the refractory inorganic oxide, 3) about 12-25% by weight of vanadium carbide, and 4) about 12-20% by weight of the metal promoter.

In the present invention, the amount of each component in the desulfurization catalyst for hydrocarbon oils can be determined by XRD crystal structure analysis.

In a particular embodiment, the spectrum obtained by XRD analysis of the desulfurization catalyst for hydrocarbon oils shows crystalline phase peaks of vanadium carbide at 2θ of about 37.3°, about 43.36° and about 63.10°.

In a preferred embodiment, the desulfurization catalyst for hydrocarbon oils provided in the present invention comprises vanadium carbide having a face-centered cubic crystal structure as a structural constituent, whereby the formation of zinc silicate and the like in the catalyst can be effectively avoided during the desulfurization of hydrocarbon oils, due to the excellent hydrothermal stability of the vanadium carbide having such a structure, so as to provide a better desulfurization activity and stability of the catalyst. Preferably, the XRD spectrum obtained after hydrothermal aging of the desulfurization catalyst for hydrocarbon oils does not show the characteristic peaks of zinc silicate at 2θ of about 22.0°, about 25.54°, about 48.9° and about 59.4°. Conditions for the hydrothermal aging include: a temperature of about 500-700° C., a steam partial pressure of about 10-30 kpa, and a treatment duration of about 10-24 h.

In a preferred embodiment, the at least one metal oxide selected from the group consisting of oxides of Group IIB, Group VB and Group VIB metals can be at least one of zinc oxide, cadmium oxide, vanadium oxide, niobium oxide, tantalum oxide, chromic oxide, molybdenum oxide and tungsten oxide. More preferably, the metal oxide is at least one of zinc oxide, molybdenum oxide and vanadium oxide. Most preferably, the metal oxide is zinc oxide.

In a preferred embodiment, the metal promoter is nickel and/or cobalt, whereby the desulfurization catalyst for hydrocarbon oils can have a higher desulfurization activity and a higher regenerability. More preferably, the metal promoter is nickel.

In a preferred embodiment, the refractory inorganic oxide is at least one of alumina, titanium oxide, zirconium dioxide and tin dioxide. Preferably, the alumina is at least one of γ-alumina, η-malumina, θ-alumina and χ-alumina. More preferably, the alumina is γ-alumina.

In some preferred embodiments, the refractory inorganic oxide can provide adhesion among the components of the desulfurization catalyst for hydrocarbon oils.

In some preferred embodiments, the desulfurization catalyst for hydrocarbon oils can also comprise other components, such as those commonly used in desulfurization catalysts, e.g. pillared clay, clay, molecular sieve, alkali metal oxide and the like. In some preferred embodiments, the pillared clay can be present in an amount of about 1-10% by weight, the clay can be present in an amount of about 1-10% by weight, the molecular sieve can be present in an amount of about 5-20% by weight, and/or the alkali metal oxide can be present in an amount of about 0.1-5% by weight.

In a preferred embodiment, the pillared clay can be an interstratified mineral crystal composed of monolayers of two mineral clay ingredients arranged in a regularly alternating manner, with the basal spacing being not less than about 1.7 nm. Preferably, examples of the pillared clay include, but not limited to, at least one of rectorite, tarasovite, bentonite, montmorillonite and smectite.

In a preferred embodiment, the clay can be selected from the group consisting of clay materials commonly known to those skilled in the art. Various commonly used clays can be used in the present invention. Preferably, the clay can be one or more selected from the group consisting of kaolin, halloysite, montmorillonite, diatomite, halloysite, metahalloysite, steatite, rectorite, sepiolite, attapulgite, hydrotalcite and bentonite.

In a preferred embodiment, the molecular sieve can be at least one selected from the group consisting of molecular sieves having a MFI structure, molecular sieves having a SAPO structure, molecular sieves having a FAU structure and molecular sieves having a BEA structure. The molecular sieve having a FAU structure can be at least one of X-type molecular sieves, Y-type molecular sieves, USY, REUSY, REHY, REY, PUSY, PREHY and PREY molecular sieves, with a $SiO_2:Al_2O_3$ molar ratio of about (1-4):1. The molecular sieve having a BEA structure can be a β molecular sieve, with a $SiO_2:Al_2O_3$ molar ratio of about (5-10):1. The SAPO molecular sieve can be at least one of SAPO-5, SAPO-11, SAPO-31, SAPO-34 and SAPO-20. The molecular sieve having a MFI structure can be a ZSM-5 molecular sieve and/or a ZSM-5 molecular sieve modified with phosphorus or a transition metal; preferably at least one of ZSM-5, ZRP-1 and ZSP-3, with a $SiO_2:Al_2O_3$ molar ratio of about (15-100):1.

In a preferred embodiment, the alkali metal oxide can be sodium oxide and/or potassium oxide.

In a second aspect, the present invention provides a process for preparing a desulfurization catalyst for hydrocarbon oils, comprising the steps of:

(i) preparing a support comprising at least one metal oxide selected from the group consisting of oxides of Group IIB, Group VB and Group VIB metals, a refractory inorganic oxide and vanadium carbide, and (ii) loading on the support at least one metal promoter selected from the group consisting of cobalt, nickel, iron and manganese, wherein the desulfurization catalyst for hydrocarbon oils comprises at least about 5% by weight of vanadium carbide, based on the total weight of the desulfurization catalyst.

In a preferred embodiment, the step (i) of the process for preparing the desulfurization catalyst for hydrocarbon oils according to the present invention further comprises the steps of:

(1a) combining vanadium carbide, a binder, water and a liquid acid to form a slurry, and mixing the slurry with at least one metal oxide selected from the group consisting of oxides of Group IIB, Group VB and Group VIB metals, to produce a support slurry; or (1b) combining a binder, water and a liquid acid to form a slurry, and mixing the slurry with at least one metal oxide selected from the group consisting of oxides of Group IIB, Group VB and Group VIB metals and vanadium carbide, to produce a support slurry; and (2) subjecting the support slurry to shaping, first drying and first calcinating, to produce a support;

wherein said refractory inorganic oxide or a precursor thereof is used as the binder.

In another preferred embodiment, the step (ii) of the process for preparing the desulfurization catalyst for hydrocarbon oils according to the present invention further comprises the steps of:

(3) incorporating a precursor of the metal promoter into the support, followed by second drying and second calcinating, to produce a catalyst precursor; and (4) reducing the catalyst precursor under a hydrogen-containing atmosphere, to produce the desulfurization catalyst for hydrocarbon oils.

In a particularly preferred embodiment, the process for preparing the desulfurization catalyst for hydrocarbon oils according to the present invention comprises the steps of:

(1a) combining vanadium carbide, a binder, water and a liquid acid to form a slurry, and mixing the slurry with at least one metal oxide selected from the group consisting of oxides of Group JIB, Group VB and Group VIB metals, to produce a support slurry; or (1b) combining a binder, water and a liquid acid to form a slurry, and mixing the slurry with at least one metal oxide selected from the group consisting of oxides of Group JIB, Group VB and Group VIB metals and vanadium carbide, to produce a support slurry;

(2) subjecting the support slurry to shaping, first drying and first calcinating, to produce a support;

(3) incorporating a precursor of the metal promoter into the support, followed by second drying and second calcinating, to produce a catalyst precursor; and (4) reducing the catalyst precursor under a hydrogen-containing atmosphere, to produce the desulfurization catalyst for hydrocarbon oils, wherein said refractory inorganic oxide or a precursor thereof is used as the binder.

The vanadium carbide can be used in the present invention in any forms, including flakes, rods, strips and powders. In some preferred embodiments, the vanadium carbide used has such a specific structure that can provide better abrasion resistance and improved desulfurization activity to the desulfurization catalyst for hydrocarbon oils. Preferably, the vanadium carbide has a face-centered cubic crystal structure and a flake or rod-like shape.

In a preferred embodiment, the vanadium carbide has a particle size of about 2-30 μm, and more preferably about 3-15 μm. Preferably, the vanadium carbide particles have a specific surface area of from about 10 m$^2$/g to 50 m$^2$/g, and more preferably about 20 m$^2$/g to 35 m$^2$/g.

In some preferred embodiments, the metal oxide can be added in the form of powders, or in the form of a slurry obtained by mixing the metal oxide with water.

In a preferred embodiment, the at least one metal oxide selected from the group consisting of oxides of Group IIB, Group VB and Group VIB metals can be at least one of zinc oxide, cadmium oxide, vanadium oxide, niobium oxide, tantalum oxide, chromic oxide, molybdenum oxide and tungsten oxide, preferably at least one of zinc oxide, molybdenum oxide and vanadium oxide, and most preferably zinc oxide.

In a preferred embodiment, the binder can be at least one selected from the group consisting of an aluminium binder, a titanium binder, a zirconium binder and a tin binder.

In a further preferred embodiment, the aluminium binder can be alumina, or a material convertible to γ-Al$_2$O$_3$ under the conditions of the first calcinating. More preferably, the aluminium binder can be at least one selected from the group consisting of PURAL™ SB powder (commercially available from Sasol company, Germany), hydrated alumina, aluminium sol, boehmite monohydrate (boehmite), pseudo-boehmite monohydrate (pseudo-boehmite), alumina trihydrate and amorphous aluminium hydroxide. Particularly preferably, the aluminium binder is at least one of PURAL™ SB powder, pseudo-boehmite and aluminium sol.

In a further preferred embodiment, the titanium binder can be a material hydrolyzable in the liquid acid and convertible to anatase-type titania under the conditions of the first calcinating. More preferably, the titanium binder can be at least one selected from the group consisting of titanium tetrachloride, ethyl titanate, isopropyl titanate, titanium acetate, hydrous titanium oxide and anatase-type titania.

In a further preferred embodiment, the zirconium binder can be a material hydrolyzable in the liquid acid and convertible to zirconium dioxide under the conditions of the first calcinating. More preferably, the zirconium binder can be at least one selected from the group consisting of zirconium tetrachloride, zirconium oxychloride, zirconium acetate, hydrous zirconium oxide and amorphous zirconium dioxide.

In a further preferred embodiment, the tin binder is a material hydrolyzable in the liquid acid and convertible to tin dioxide under the conditions of the first calcinating. More preferably, the tin binder can be at least one selected from the group consisting of tin tetrachloride, tin tetra-isopropoxide, tin acetate, hydrous tin oxide and tin dioxide.

In a preferred embodiment, the titanium binder, zirconium binder and/or tin binder can be hydrolyzed, when being contacted with an excessive amount of an acidic solution, to form an adhesive colloidal solution.

In some preferred embodiments, the liquid acid can be an acid or an aqueous solution of an acid, wherein the acid can be selected from the group consisting of water soluble inorganic acids and organic acids, and is preferably at least one selected from the group consisting of hydrochloric acid, nitric acid, phosphoric acid and acetic acid.

In a preferred embodiment, the liquid acid is used in such an amount that the support slurry can have a pH of about 1-5, and preferably about 1.5-4.

In some preferred embodiments, the amount of water added in the steps (1a) and (1b) is not particularly restricted, so long as a support slurry can be obtained. For example, the weight ratio of the added water to the binder can be from about 5:1 to about 10:1; or the weight ratio of the added water to the combination of the binder and the vanadium carbide can be from about 5:1 to about 10:1.

In some preferred embodiments, other components commonly used in the preparation of desulfurization catalysts, such as pillared clay, clay, molecular sieve, precursors of alkali metal oxide and the like, can also be added in the steps (1a) and (1b). Suitable pillared clay, clay and molecular sieves are as described above. The precursor of alkali metal oxide can be a material convertible to an alkali metal oxide under the conditions of the first calcinating in the step (2), such as alkali metal oxides, alkali metal nitrates, alkali metal sulfates and alkali metal phosphates, and is preferably at least one selected from the group consisting of sodium oxide, potassium oxide, sodium nitrate, potassium nitrate, potassium sulfate, sodium sulfate, potassium phosphate and sodium phosphate.

In some preferred embodiments, the support slurry obtained can be in the form of a paste or a slurry, or the like. Preferably, the support slurry can be thickened, dried and then shaped. More preferably, the support slurry is in the form of a slurry, which can be formed into microspheres having a particle size of about 20-200 μm by spray drying. For the convenience of spray drying, the support slurry has preferably a solid content of about 10-50% by weight, more preferably about 20-50% by weight, before drying. Water can also be added during the preparation of the support slurry, where the amount of water added is not particularly restricted, so long as the support slurry obtained satisfies the aforementioned solid content requirement.

In some preferred embodiments, the method and conditions for the first drying in the step (2) are familiar to those skilled in the art. For example, the method for drying can be airing, baking, or air-blast drying. Preferably, the first drying is conducted at a temperature of from room temperature to about 400° C., and more preferably about 100-350° C. Preferably, the first drying is conducted for about 0.5 h or more, more preferably about 0.5-100 h, and particularly preferably about 2-20 h.

In some preferred embodiments, conditions for the first calcinating in the step (2) are also familiar to those skilled in the art. Preferably, the first calcinating is conducted at a temperature of about 400-700° C., and more preferably about 450-650° C. Preferably, the first calcinating is conducted for at least about 0.5 h, more preferably about 0.5-100 h, and particularly preferably about 0.5-10 h.

In some preferred embodiments, the precursor of the metal promoter used in the step (3) of the process for preparing the desulfurization catalyst for hydrocarbon oils according to the present invention can be a material convertible to an oxide of the metal promoter under conditions for the second calcinating. Preferably, the precursor of the metal promoter can be at least one selected from the group consisting of acetates, carbonates, nitrates, sulfates, thiocyanates and oxides of the metal promoter. More preferably, the precursor of the metal promoter can be at least one of acetate, carbonate, nitrate, sulfate, thiocyanate and oxide of at least one of cobalt, nickel, iron and manganese; particularly preferably at least one of acetate, carbonate, nitrate, sulfate, thiocyanate and oxide of nickel and/or cobalt, in particular of nickel; further preferably nickel nitrate and/or cobalt nitrate; and most preferably nickel nitrate.

In a preferred embodiment, the precursor of the metal promoter is loading in the step (3) of the process for preparing the desulfurization catalyst for hydrocarbon oils according to the present invention onto the support via impregnation or precipitation. The impregnation can be carried out by immersing the support in a solution or suspension of the precursor of the metal promoter. The precipitation can be carried out by mixing a solution or suspension of the precursor of the metal promoter with the support, and then precipitating the precursor of the metal promoter onto the support by adding aqueous ammonia.

In a preferred embodiment, the second drying can be conducted at a temperature of about 50-300° C., preferably about 100-250° C., for about 0.5-8 h, preferably about 1-5 h.

In a preferred embodiment, the second calcinating can be conducted at a temperature of about 300-800° C., preferably about 450-750° C., for about 0.5 h or more, preferably about 1-3 h. The second calcinating can be carried out in the presence of oxygen or an oxygen-containing gas, to the extent that volatiles are removed and the precursor of the metal promoter is converted to an oxide of the metal promoter, so as to produce the catalyst precursor.

In a preferred embodiment, the step (4) of the process for preparing the desulfurization catalyst for hydrocarbon oils according to the present invention is performed to convert the oxide of the metal promoter in the catalyst precursor to an elementary metal. Particularly, the catalyst precursor can be reduced under a hydrogen-containing atmosphere, whereby the metal promoter is substantially present in reduced state, so as to produce the catalyst according to the present invention. Conditions for the reduction are such that only the oxide of the metal promoter in the catalyst precursor is converted to an elementary metal, with substantially no coversion of the metal oxide in the support. Preferably, the reduction is carried out at a temperature of about 300-600° C., and more preferably about 400-500° C. Preferably, the reduction is carried out for about 0.5-6 h, and more preferably about 1-3 h. Preferably, the hydrogen-containing atmosphere has a hydrogen content of about 10-60 vol %.

In a preferred embodiment, the reduction of the catalyst precursor in the step (4) can be carried out immediately after the preparation of the catalyst precursor, or just before use, i.e. before use in adsorption desulfurization. As the metal promoter is easy to be oxidized, while the metal promoter in the catalyst precursor is present in the form of an oxide, it is preferable to carry out the reduction of the catalyst precursor in the step (4) just before adsorption desulfurization, for the convenience of transportation. The reduction allows the metal in the oxide of the metal promoter being substantially present in reduced state, so as to produce the desulfurization catalyst according to the present invention.

In a preferred embodiment, the binder, the vanadium carbide, the metal oxide and the precursor of the metal promoter are added in such amounts that the desulfurization catalyst for hydrocarbon oils thus obtained comprises, based on the total weight of the desulfurization catalyst, about 10-80% by weight, preferably about 25-70% by weight, particularly preferably about 40-60% by weight, of the metal oxide; about 3-35% by weight, preferably about 6-25% by weight, particularly preferably about 8-15% by weight, of the refractory inorganic oxide; about 5-40% by weight, preferably about 10-30% by weight, particularly preferably about 12-25% by weight, of the vanadium carbide; and about 5-30% by weight, preferably about 8-25% by weight, particularly preferably about 12-20% by weight, of the metal promoter.

In some preferred embodiments, the process for preparing the desulfurization catalyst for hydrocarbon oils according to the present invention further involves the addition of some components commonly used in the preparation of desulfurization catalysts, in such an amount that the desulfurization catalyst thus obtained comprises about 1-10% by weight of pillared clay, about 1-10% by weight of clay, about 5-20% by weight of molecular sieve, and/or about 0.1-5% by weight of alkali metal oxide.

In a third aspect, the present invention provides a desulfurization catalyst for hydrocarbon oils produced by the process for preparing the desulfurization catalyst for hydrocarbon oils according to the present invention.

In a fourth aspect, the present invention provides use of the desulfurization catalyst for hydrocarbon oils according to the present invention in the desulfurization of sulfur-containing hydrocarbon oils.

In some preferred embodiments, said use comprises the step of contacting a sulfur-containing hydrocarbon oil with the desulfurization catalyst for hydrocarbon oils according to the present invention in the presence of hydrogen.

In further preferred embodiments, said use comprises: contacting a sulfur-containing hydrocarbon oil with the desulfurization catalyst for hydrocarbon oils according to the present invention under a hydrogen atmosphere at a temperature of about 350-500° C. and under a pressure of about 0.5-4 MPa to conduct a desulfurization reaction. More preferably, the desulfurization reaction is conducted at a temperature of about 400-450° C. and under a pressure of about 1.0-2.0 MPa. During the reaction, the sulfur in the hydrocarbon oil is adsorbed onto the catalyst, so that a hydrocarbon oil with a low sulfur content can be obtained.

In some preferred embodiments, the spent catalyst can be regenerated after the desulfurization reaction for reuse.

Preferably, the regeneration is carried out under an oxygen atmosphere and atmospheric pressure at a temperature of about 400-700° C., and preferably about 500-600° C.

In some preferred embodiments, before reuse for hydrocarbon oil desulfurization, the regenerated catalyst is subjected to reduction under a hydrogen-containing atmosphere at a temperature of about 350-500° C., preferably about 400-450, and under a pressure of about 0.2-2 MPa, preferably about 0.2-1.5 MPa.

In the context of the present application, all pressure values are provided as gage pressure.

As used herein, the terms "hydrocarbon oil" and "hydrocarbon-containing fluid" can be used interchangeably, which include, but not limited to, cracking gasoline and diesel fuel. The term "cracking gasoline" refers to hydrocarbons having a boiling range of from about 40° C. to about 210° C. or any fraction thereof, which are normally products from thermal or catalytic processes for cracking higher hydrocarbons to lower hydrocarbons. Examples of suitable thermal cracking processes include, but not limited to, coking, thermal cracking, and visbreaking processes, and combinations thereof. Examples of suitable catalytic cracking processes include, but not limited to, fluid catalytic cracking and heavy oil catalytic cracking processes, and combinations thereof. Accordingly, suitable cracking gasoline includes, but not limited to, coker gasoline, thermal cracking gasoline, visbreaker gasoline, fluid catalytic cracking gasoline and heavy oil cracking gasoline, and combinations thereof. In a preferred embodiment, when used as the hydrocarbon-containing fluid in the present invention, the cracking gasoline can be subjected to fractionation and/or hydrotreatment prior to desulfurization.

would otherwise decrease the desulfurization activity of the catalyst due to the loss of zinc oxide. The catalyst according to the present invention shows a high desulfurization activity, and greatly improved abrasion strength, and thus is suitable for use in the desulfurization process of various hydrocarbon oils, such as cracking gasoline or diesel fuel, involving repeated reactions and regenerations of the catalyst. In addition, the desulfurization catalyst for hydrocarbon oils according to the present invention also shows some level of dehydrogenation activity, which contributes not only to reducing the hydrogen consumption of the desulfurization process, but also to increasing to some extent the quality of desulfurized gasoline.

EXAMPLES

The present invention will be further illustrated hereinbelow in more detail with reference to the examples.

XRD spectrums of the desulfurization catalysts for hydrocarbon oils obtained in the inventive Examples and Comparative Examples as described below were obtained for structure determination using an X-ray diffractometer (Siemens company, model D5005), under the conditions of: Cu-target, K$\alpha$-radiation, solid state detector, a tube voltage of 40 kV, and a tube current of 40 mA.

The vanadium carbide used in the inventive Examples as described below was vanadium carbide-1, vanadium carbide-2 or vanadium carbide-3, provided by Nanjing Division of Sinopec Catalyst Co., Ltd., of which the structural characteristics are shown in Table 1 below,

TABLE 1

| Structural characteristics of the vanadium carbide used in the inventive Examples | | | |
|---|---|---|---|
| Structural characteristics | Vanadium carbide-1 | Vanadium carbide-2 | Vanadium carbide-3 |
| Structure | Face-centered cubic crystal, lake-shaped | Face-centered cubic crystal, rod-shaped | Face-centered cubic crystal, lake-shaped |
| Average particle size *, $\mu$m | 9.5 | 3.6 | 15.0 |
| Specific surface area, m$^2$/g | 10.0 | 26.0 | 3.2 |

* Measured by a laser particle size analyzer (Mastersizer 2000 from Malvern company).

The term "diesel fuel" refers to a liquid composed of a mixture of hydrocarbons having a boiling range of from about 170° C. to about 450° C. or any fraction thereof. Such kind of hydrocarbon-containing fluids include, but not limited to, light cycle oil, kerosene, straight-run diesel oil, hydrotreated diesel oil and combinations thereof.

As used herein, the term "sulfur" refers to any species containing the sulfur element, such as organosulfur compounds normally present in hydrocarbon-containing fluids, e.g. cracking gasoline or diesel fuel. The sulfur present in the hydrocarbon-containing fluid according to the present invention includes, but not limited to, carbonyl sulfide (COS), carbon disulfide ($CS_2$), thiol or other thiophene compounds and combinations thereof, especially thiophene, benzothiophene, alkylthiophene, alkylbenzothiophthene and alkyl dibenzothiophene, as well as thiophene compounds having higher molecular weights that are normally present in diesel fuels.

The desulfurization catalyst for hydrocarbon oils according to the present invention comprises a vanadium carbide component, which can hardly react with the zinc oxide component during repeated reactions and regenerations of the catalyst, so that no zinc silicate will be produced, which For convenience, in the inventive Examples 1-14 and Comparative Examples 1-5 as described below, the composition of the hydrocarbon oil desulfurization catalysts was determined via calculation based on the amounts of the starting materials used for their preparation. It has been found that the composition determined in this way is substantially identical to the composition of the catalyst determined by XRD crystal structure analysis.

Example 1: Preparation of the Desulfurization Catalyst for Hydrocarbon Oils (According to the Present Invention)

(1) Preparation of a Support 4.43 kg of zinc oxide powders (Headhorse company, with a purity of 99.7 wt %) and 6.57 kg of deionized water were mixed, and stirred for 30 min to provide a zinc oxide slurry.

1.81 kg of pseudo-boehmite (Nanjing Division of Sinopec Catalyst Co., Ltd., containing 1.36 kg on a dry basis) and 2.40 kg of vanadium carbide-1 were mixed under stirring, then added with 4.6 kg of deionized water and mixed homogeneously to provide a slurry. The slurry was further added with 360 ml of 30 wt % hydrochloric acid (Beijing Chemical Works, chemically pure), resulting in a pH=2.1. After acidification for 1 h under stirring, the temperature was raised to 80° C., and the slurry was aged for 2 h, mixed with the zinc oxide slurry and then stirred for 1 h to provide a support slurry.

The support slurry was spray dried using a spray dryer of model Niro Bowen Nozzle Tower™, under a spray drying pressure of 8.5 to 9.5 MPa, with an inlet temperature of 500° C. or less and an outlet temperature of about 150° C. Microspheres obtained by spray drying were firstly dried at a temperature of 180° C. for 1 h, followed by calcinating at a temperature of 635° C. for 1 h to provide a support.

(2) Preparation of a Catalyst Precursor 3.2 kg of the support was impregnated with 3.51 kg of nickel nitrate hexahydrate (Sinopharm Chemical Reagent Co., Ltd., with a purity >98.5 wt %) and 0.6 kg of deionized water solution, and the impregnated support was dried at a temperature of 180° C. for 4 h, followed by calcinating under an air atmosphere at a temperature of 635° C. for 1, to provide a catalyst precursor.

(3) Reduction

The catalyst precursor was reduced under a hydrogen atmosphere at a temperature of 425° C. for 2 h, providing a hydrocarbon oil desulfurization catalyst A1.

The catalyst A1 has a chemical composition of: 44.3% by weight of zinc oxide, 24.0% by weight of vanadium carbide, 13.6% by weight of alumina, and 18.1% by weight of nickel.

Example 2: Preparation of the Desulfurization Catalyst for Hydrocarbon Oils (According to the Present Invention)

1.56 kg of pseudo-boehmite (Nanjing Division of Sinopec Catalyst Co., Ltd., containing 1.17 kg on a dry basis) and 1.80 kg of vanadium carbide-2 were mixed under stirring, then added with 8.2 kg of deionized water and mixed homogeneously to provide a slurry. The slurry was further added with 260 ml of 30 wt % hydrochloric acid, resulting in a pH=1.9. After acidification for 1 h under stirring, the temperature was raised to 80° C., and the slurry was aged for 2 h. After the temperature was decreased, 5.52 kg of zinc oxide powders were further added and stirred for 1 h to provide a support slurry.

The support slurry was shaped by spray drying, and the active ingredient nickel was incorporated, followed by reduction, in accordance with the process as described in Example 1, providing a hydrocarbon oil desulfurization catalyst A2.

The catalyst A2 had a chemical composition of: 55.2% by weight of zinc oxide, 18.0% by weight of vanadium carbide, 11.7% by weight of alumina, and 15.1% by weight of nickel.

Example 3: Preparation of the Desulfurization Catalyst for Hydrocarbon Oils (According to the Present Invention)

4.93 kg of zinc oxide powders, 2.1 kg of vanadium carbide-3 and 8.8 kg of deionized water were mixed, and stirred for 30 min to provide a mixed slurry of zinc oxide and vanadium carbide.

1.80 kg of pseudo-boehmite (Shandong Division of Aluminum Corporation of China Limited, containing 1.36 kg on a dry basis) and 4.6 kg of deionized water were mixed homogeneously to provide a slurry, and then added with 300 ml of 30 wt % hydrochloric acid (Beijing Chemical Works, chemically pure), resulting in a pH=2.5. After acidification for 1 h under stirring, the temperature was raised to 80° C., and the slurry was aged for 2 h. Then, the mixed slurry of zinc oxide and vanadium carbide was further added and stirred for 1 h to provide a support slurry.

The support slurry was shaped by spray drying in accordance with the process as described in Example 1.

A catalyst precursor and a catalyst were prepared in accordance with the process as described in Example 1, except that a solution of nickel nitrate and cobalt nitrate was used in place of the nickel nitrate hexahydrate for the impregnation of the support, and the active ingredients nickel and cobalt were incorporated, followed by reduction, providing a hydrocarbon oil desulfurization catalyst A3.

The catalyst A3 had a chemical composition of: 49.3% by weight of zinc oxide, 21.0% by weight of vanadium carbide, 13.5% by weight of alumina, 8.1% by weight of nickel and 8.1% by weight of cobalt.

Example 4: Preparation of the Desulfurization Catalyst for Hydrocarbon Oils (According to the Present Invention)

4.93 kg of zinc oxide powders, 2.1 kg of vanadium carbide-1 and 8.8 kg of deionized water were mixed, and stirred for 30 min to provide a mixed slurry of zinc oxide and vanadium carbide.

1.80 kg of pseudo-boehmite (Shandong Division of Aluminum Corporation of China Limited, containing 1.36 kg on a dry basis) and 4.6 kg of deionized water were mixed homogeneously to provide a slurry, then added with 300 ml of 30 wt % hydrochloric acid, resulting in a pH=2.5. After acidification for 1 h under stirring, the temperature was raised to 80° C., and the slurry was aged for 2 h. Then, the mixed slurry of zinc oxide and vanadium carbide was further added and stirred for 1 h to provide a support slurry.

The support slurry was shaped by spray drying, and the active ingredient nickel was incorporated, followed by reduction, in accordance with the process as described in Example 1, providing a hydrocarbon oil desulfurization catalyst A4.

The catalyst A4 had a chemical composition of: 49.3% by weight of zinc oxide, 21.0% by weight of vanadium carbide, 13.5% by weight of alumina, and 16.2% by weight of nickel.

Example 5: Preparation of the Desulfurization Catalyst for Hydrocarbon Oils (According to the Present Invention)

3.25 kg of titanium tetrachloride (Beijing Chemical Works, analytically pure, 99 wt %) was added gradually to 4.6 kg of 5 wt % dilute hydrochloric acid, and stirred slowly to avoid the crystallization and precipitation of titania, providing a light yellow, transparent titanium sol at pH=2.0.

4.43 kg of zinc oxide powders (Headhorse company, with a purity of 99.7 wt %), 2.40 kg of vanadium carbide-1 and 6.57 kg of deionized water were mixed, and stirred for 30 min to provide a mixed slurry of zinc oxide and vanadium carbide. Then, the titanium sol obtained above was added, mixed and stirred for 1 h to provide a support slurry.

The support slurry was shaped by spray drying, and the active ingredient nickel was incorporated, followed by reduction, in accordance with the process as described in Example 1, providing a hydrocarbon oil desulfurization catalyst A5.

The catalyst A5 had a chemical composition of: 44.3% by weight of zinc oxide, 24.0% by weight of vanadium carbide, 13.6% by weight of titania, and 18.1% by weight of nickel.

Example 6: Preparation of the Desulfurization Catalyst for Hydrocarbon Oils (According to the Present Invention)

1.25 kg of titania (anatase type, containing 1.17 kg on a dry basis) was added to 1.8 kg of deionized water and 1.0 kg of 30 wt % hydrochloric acid (Beijing Chemical Works, chemically pure), pH=1.9, and reacted under stirring for 1 h, providing a light yellow, transparent titanium sol.

1.80 kg of vanadium carbide-2, 5.52 kg of zinc oxide powders and 10.0 kg of deionized water were mixed under stirring to provide a mixed slurry of zinc oxide and vanadium carbide, then added with the titanium sol obtained above and stirred for 1 h to provide a support slurry.

The support slurry was shaped by spray drying, and the active ingredient nickel was incorporated, followed by reduction, in accordance with the process as described in Example 1, providing a hydrocarbon oil desulfurization catalyst A6.

The catalyst A6 had a chemical composition of: 55.2% by weight of zinc oxide, 18.0% by weight of vanadium carbide, 11.7% by weight of titania, and 15.1% by weight of nickel.

Example 7: Preparation of the Desulfurization Catalyst for Hydrocarbon Oils (according to the Present Invention)

3.90 kg of ethyl titanate (Aldrich company, analytically pure, 99 wt %) and 1.6 kg of deionized water were added gradually under stirring to 3.8 kg of 10 wt % nitric acid solution (Beijing Chemical Works, analytically pure), pH=2.3, and stirred for 1 h, providing a light yellow, transparent titanium sol.

4.93 kg of zinc oxide powders, 2.1 kg of vanadium carbide-3, and 8.8 kg of deionized water were mixed, and stirred for 30 min to provide a mixed slurry of zinc oxide and vanadium carbide, then added with the titanium sol and stirred for 1 h to provide a support slurry.

The support slurry was shaped by spray drying in accordance with the process as described in Example 1.

A catalyst precursor and a catalyst were prepared in accordance with the process as described in Example 1, except that a solution of nickel nitrate and cobalt nitrate was used in place of the nickel nitrate hexahydrate for the impregnation of the support, and the active ingredients nickel and cobalt were incorporated, followed by reduction, providing a hydrocarbon oil desulfurization catalyst A7.

The catalyst A7 had a chemical composition of: 49.3% by weight of zinc oxide, 21.0% by weight of vanadium carbide, 13.5% by weight of titania, 8.1% by weight of nickel and 8.1% by weight of cobalt.

Example 8: Preparation of the Desulfurization Catalyst for Hydrocarbon Oils (According to the Present Invention)

3.90 kg of ethyl titanate (Aldrich company, analytically pure, 99 wt %) and 1.6 kg of deionized water were added gradually under stirring to 3.8 kg of 10 wt % nitric acid solution (Beijing Chemical Works, analytically pure), pH=2.3, and stirred for 1 h, providing a light yellow, transparent titanium sol.

4.93 kg of zinc oxide powders, 2.1 kg of vanadium carbide-1, and 8.8 kg of deionized water were mixed, and stirred for 30 min to provide a mixed slurry of zinc oxide and vanadium carbide, then added with the titanium sol and stirred for 1 h to provide a support slurry.

The support slurry was shaped by spray drying, and the active ingredient nickel was incorporated, followed by reduction, in accordance with the process as described in Example 1, providing a hydrocarbon oil desulfurization catalyst A8.

The catalyst A8 had a chemical composition of: 49.3% by weight of zinc oxide, 21.0% by weight of vanadium carbide, 13.5% by weight of titania, and 16.2% by weight of nickel.

Example 9: Preparation of the Desulfurization Catalyst for Hydrocarbon Oils (According to the Present Invention)

2.60 kg of zirconium tetrachloride (Beijing Chemical Works, analytically pure, 99 wt %) was added gradually to 5.0 kg of deionized water, and added with 4.6 kg of 5 wt % nitric acid solution, and stirred slowly to avoid the crystallization and precipitation of zirconia, providing a light yellow, transparent zirconium sol at pH=2.1.

4.43 kg of zinc oxide powders (Headhorse company, with a purity of 99.7 wt %), 2.40 kg of vanadium carbide-2 and 6.57 kg of deionized water were mixed, and stirred for 30 min to provide a mixed slurry of zinc oxide and vanadium carbide. Then, the zirconium sol obtained above was added, mixed and stirred for 1 h to provide a support slurry.

The support slurry was shaped by spray drying, and the active ingredient nickel was incorporated, followed by reduction, in accordance with the process as described in Example 1, providing a hydrocarbon oil desulfurization catalyst A9.

The catalyst A9 had a chemical composition of: 44.3% by weight of zinc oxide, 24.0% by weight of vanadium carbide, 13.6% by weight of zirconia, and 18.1% by weight of nickel.

Example 10: Preparation of the Desulfurization Catalyst for Hydrocarbon Oils (According to the Present Invention)

3.21 kg of tin tetrachloride ($SnCl_4 \cdot 5H_2O$, Alfa company, 99 wt %) was added gradually to 5.0 kg of deionized water, then added with 4.6 kg of 5 wt % nitric acid solution, and stirred slowly to avoid the crystallization and precipitation of tin oxide, providing a colorless, transparent tin sol at pH=2.1.

4.43 kg of zinc oxide powders (Headhorse company, with a purity of 99.7 wt %), 2.40 kg of vanadium carbide-3 and 6.57 kg of deionized water were mixed, and stirred for 30 min to provide a mixed slurry of zinc oxide and vanadium carbide. Then, the tin sol obtained above was added, mixed and stirred for 1 h to provide a support slurry.

The support slurry was shaped by spray drying, and the active ingredient nickel was incorporated, followed by reduction, in accordance with the process as described in Example 1, providing a hydrocarbon oil desulfurization catalyst A10.

The catalyst A10 had a chemical composition of: 44.3% by weight of zinc oxide, 24.0% by weight of vanadium carbide, 13.6% by weight of tin dioxide, and 18.1% by weight of nickel.

Example 11: Preparation of the Desulfurization Catalyst for Hydrocarbon Oils (According to the Present Invention)

5.02 kg of zinc oxide powders (Headhorse company, with a purity of 99.7 wt %) and 6.17 kg of deionized water were mixed, and stirred for 30 min to provide a zinc oxide slurry.

1.56 kg of pseudo-boehmite (Nanjing Division of Sinopec Catalyst Co., Ltd., containing 1.17 kg on a dry basis) and 1.50 kg of vanadium carbide-1 were mixed under stirring, then added with 1.08 kg of kaolin (China Kaolin Co., Ltd., containing 0.8 kg on a dry basis) and 4.6 kg of deionized water, and mixed homogeneously to provide a slurry. The slurry was further added with 360 ml of 30 wt % hydrochloric acid (Beijing Chemical Works, chemically pure), resulting in a pH=2.1. After acidification for 1 h under stirring, the temperature was raised to 80° C., and the slurry was aged for 2 h, mixed with the zinc oxide slurry and then stirred for 1 h to provide a support slurry.

The support slurry was shaped by spray drying, and the active ingredient nickel was incorporated, followed by reduction, in accordance with the process as described in Example 1, providing a hydrocarbon oil desulfurization catalyst A11.

The catalyst A11 had a chemical composition of: 50.2% by weight of zinc oxide, 15.0% by weight of vanadium carbide, 11.7% by weight of alumina, 8% by weight of kaolin and 15.1% by weight of nickel.

Example 12: Preparation of the Desulfurization Catalyst for Hydrocarbon Oils (According to the Present Invention)

2.78 kg of titanium tetrachloride (Beijing Chemical Works, analytically pure, 99 wt %) was added gradually to 4.6 kg of 5 wt % dilute hydrochloric acid, and stirred slowly to avoid the crystallization and precipitation of titania, providing a light yellow, transparent titanium sol at pH=2.0.

5.12 kg of zinc oxide powders (Headhorse company, with a purity of 99.7 wt %), 0.88 kg of SAPO-34 molecular sieve (Qilu Division of Sinopec Catalyst Co., Ltd., containing 0.7 kg on a dry basis), 1.50 kg of vanadium carbide-1 and 6.57 kg of deionized water were mixed, and stirred for 30 min to provide a mixed slurry of zinc oxide, SAPO-34 and vanadium carbide. Then, the titanium sol obtained above was added, mixed and stirred for 1 h to provide a support slurry.

The support slurry was shaped by spray drying, and the active ingredient nickel was incorporated, followed by reduction, in accordance with the process as described in Example 1, providing a hydrocarbon oil desulfurization catalyst A12.

The catalyst A12 had a chemical composition of: 51.2% by weight of zinc oxide, 15.0% by weight of vanadium carbide, 11.7% by weight of titania, 7% by weight of SAPO-34 molecular sieve and 15.1% by weight of nickel.

Example 13: Preparation of the Desulfurization Catalyst for Hydrocarbon Oils (According to the Present Invention)

2.60 kg of zirconium tetrachloride (Beijing Chemical Works, analytically pure, 99 wt %) was added gradually to 5.0 kg of deionized water, then added with 4.6 kg of 5 wt % nitric acid solution, and stirred slowly to avoid the crystallization and precipitation of zirconia, providing a light yellow, transparent zirconium sol at pH=2.1.

4.43 kg of zinc oxide powders (Headhorse company, with a purity of 99.7 wt %), 2.40 kg of vanadium carbide-2, 0.43 kg of potassium nitrate (Sinopharm Chemical Reagent Co., Ltd., with a purity of 99.7 wt %) and 6.57 kg of deionized water were mixed, and stirred for 30 min to provide a mixed slurry of zinc oxide, potassium nitrate and vanadium carbide. Then, the zirconium sol obtained above was added, mixed and stirred for 1 h to provide a support slurry.

The support slurry was shaped by spray drying, and the active ingredient nickel was incorporated, followed by reduction, in accordance with the process as described in Example 1, providing a hydrocarbon oil desulfurization catalyst A13.

The catalyst A13 had a chemical composition of: 44.3% by weight of zinc oxide, 24.0% by weight of vanadium carbide, 13.6% by weight of zirconia, 2% by weight of potassium oxide and 16.1% by weight of nickel.

Example 14: Preparation of the Desulfurization Catalyst for Hydrocarbon Oils (According to the Present Invention)

4.43 kg of zinc oxide powders (Headhorse company, with a purity of 99.7 wt %), 0.93 kg of rectorite (Qilu Division of Sinopec Catalyst Co., Ltd., containing 0.70 kg on a dry basis) and 6.57 kg of deionized water was mixed, and stirred for 30 min to provide a mixed slurry of zinc oxide and rectorite.

1.33 kg of pseudo-boehmite (Nanjing Division of Sinopec Catalyst Co., Ltd., containing 1.0 kg on a dry basis) and 2.06 kg of vanadium carbide-1 were mixed under stirring, then added with 4.6 kg of deionized water and mixed homogeneously to provide a slurry. The slurry was further added with 360 ml of 30 wt % hydrochloric acid (Beijing Chemical Works, chemically pure), resulting in a pH=2.1. After acidification for 1 h under stirring, the temperature was raised to 80° C., the slurry was aged for 2 h, then mixed with the mixed slurry of zinc oxide and rectorite and stirred for 1 h to provide a support slurry.

The support slurry was shaped by spray drying, and the active ingredient nickel was incorporated, followed by reduction, in accordance with the process as described in Example 1, providing a hydrocarbon oil desulfurization catalyst A14.

The catalyst A14 had a chemical composition of: 44.3% by weight of zinc oxide, 20.6% by weight of vanadium carbide, 7.0% by weight of rectorite, 10.0% by weight of alumina and 18.1% by weight of nickel.

Comparative Example 1: Preparation of the Desulfurization Catalyst for Hydrocarbon Oils (not the Present Invention)

4.43 kg of zinc oxide powders and 6.57 kg of deionized water were mixed, and stirred for 30 min to provide a zinc oxide slurry.

1.81 kg of pseudo-boehmite (Nanjing Division of Sinopec Catalyst Co., Ltd., containing 1.36 kg on a dry basis) and 2.46 kg of expanded perlite (Nanjing Division of Sinopec Catalyst Co., Ltd., containing 2.40 kg on a dry basis) were mixed under stirring, then added with 4.6 kg of deionized water and mixed homogeneously to provide a slurry. The slurry was further added with 360 ml of 30 wt % hydrochloric acid, resulting in a pH=2.1. After acidification for 1 h under stirring, the temperature was raised to 80° C., and the slurry was aged for 2 h, mixed with the zinc oxide slurry and then stirred for 1 h to provide a support slurry.

The support slurry was shaped by spray drying, and the active ingredient nickel was incorporated, followed by reduction, in accordance with the process as described in Example 1, providing a hydrocarbon oil desulfurization catalyst B1.

The catalyst B1 had a chemical composition of: 44.3% by weight of zinc oxide, 24.0% by weight of expanded perlite, 13.6% by weight of alumina, and 18.1% by weight of nickel.

Comparative Example 2: Preparation of the Desulfurization Catalyst for Hydrocarbon Oils (not the Present Invention)

1.56 kg of pseudo-boehmite (Shandong Division of Aluminum Corporation of China Limited, containing 1.17 kg on a dry basis) and 1.85 kg of diatomite (containing 1.80 kg on a dry basis) were mixed under stirring, then added with 8.2 kg of deionized water and mixed homogeneously to provide a slurry. The slurry was further added with 260 ml of 30 wt % hydrochloric acid, resulting in a pH=1.9. After acidification for 1 h under stirring, the temperature was raised to 80° C., and the slurry was aged for 2 h. After the temperature was decreased, 5.52 kg of zinc oxide powders were further added and stirred for 1 h to provide a support slurry.

The support slurry was shaped by spray drying, and the active ingredient nickel was incorporated, followed by reduction, in accordance with the process as described in Example 1, providing a hydrocarbon oil desulfurization catalyst B2.

The catalyst B2 had a chemical composition of: 55.2% by weight of zinc oxide, 18.0% by weight of diatomite, 11.7% by weight of alumina, and 15.1% by weight of nickel.

Comparative Example 3: Preparation of the Desulfurization Catalyst for Hydrocarbon Oils (not the Present Invention)

4.93 kg of zinc oxide powders and 5.57 kg of deionized water were mixed, and stirred for 30 min to provide a zinc oxide slurry.

1.80 kg of pseudo-boehmite (Shandong Division of Aluminum Corporation of China Limited, containing 1.35 kg on a dry basis) and 2.16 kg of diatomite (World mining company, containing 2.10 kg on a dry basis) were mixed under stirring, then added with 4.6 kg of deionized water and mixed homogeneously to provide a slurry. The slurry was further added with 300 ml of 30 wt % hydrochloric acid, resulting in a pH=2.5. After acidification for 1 h under stirring, the temperature was raised to 80° C., and the slurry was aged for 2 h. Then, the zinc oxide slurry was further added and stirred for 1 h to provide a support slurry.

The support slurry was shaped by spray drying, and the active ingredients nickel and cobalt were incorporated, followed by reduction, in accordance with the process as described in Example 3, providing a hydrocarbon oil desulfurization catalyst B3.

The catalyst B3 had a chemical composition of: 49.3% by weight of zinc oxide, 21.0% by weight of diatomite, 13.5% by weight of alumina, 8.1% by weight of nickel and 8.1% by weight of cobalt.

Comparative Example 4: Preparation of the Desulfurization Catalyst for Hydrocarbon Oils (not the Present Invention)

4.93 kg of zinc oxide powders and 5.57 kg of deionized water were mixed, and stirred for 30 min to provide a zinc oxide slurry.

1.80 kg of pseudo-boehmite (Shandong Division of Aluminum Corporation of China Limited, containing 1.35 kg on a dry basis) and 2.84 kg of kaolin (China Kaolin Co., Ltd., containing 2.10 kg on a dry basis) were mixed under stirring, then added with 3.6 kg of deionized water and mixed homogeneously to provide a slurry. The slurry was further added with 300 ml of 30 wt % hydrochloric acid, resulting in a pH=2.5. After acidification for 1 h under stirring, the temperature was raised to 80° C., and the slurry was aged for 2 h. Then, the zinc oxide slurry was further added and stirred for 1 h to provide a support slurry.

The support slurry was shaped by spray drying, and the active ingredient nickel was incorporated, followed by reduction, in accordance with the process as described in Example 1, providing a hydrocarbon oil desulfurization catalyst B4.

The catalyst B4 had a chemical composition of: 49.3% by weight of zinc oxide, 21.0% by weight of kaolin, 13.5% by weight of alumina, and 16.2% by weight of nickel.

Comparative Example 5: Preparation of the Desulfurization Catalyst for Hydrocarbon Oils (not the Present Invention)

The process as described in Example 1 was repeated, except that 2.40 kg of an ordered porous silicon carbonitride material prepared according to Example 2 of CN101774593A was used in place of 2.40 kg of the vanadium carbide-1, providing a hydrocarbon oil desulfurization catalyst B5.

The catalyst B5 had a chemical composition of: 44.3% by weight of zinc oxide, 24.0% by weight of the ordered porous silicon carbonitride material, 13.6% by weight of alumina, and 18.1% by weight of nickel.

Example 15: Evaluation of the Performance of the Desulfurization Catalyst for Hydrocarbon Oils (1) Evaluation of the Abrasion Strength Measurements were conducted for evaluating the abrasion strength of the hydrocarbon oil desulfurization catalysts A1-A14 and B1-B5. The measurement was conducted using the straight-tube method for abrasion strength evaluation in accordance with Q/SH 3360 212-2009, an enterprise standard of SINOPEC Research Institute of Petroleum Processing (RIPP), in which the adsorbent was loaded into a straight tube for abrasion test, abraded firstly in a straight-tube abrading device (ASTM standard, Model 8920) for 1 h, and then for another 2.5 h. Abrasion index of the adsorbent was calculated based on the mass of fine powders generated by abrasion. The results are shown in Table 2. A lower value indicates a higher abrasion strength. The abrasion indexes shown in Table 2 correspond to the percentage of the fine powders generated when being abraded under certain conditions.

(2) Evaluation of the Desulfurization Performance

Experiments for evaluating the desulfurization performance of the hydrocarbon oil desulfurization catalysts A1-A14 and B1-B5 were carried out using a fixed-bed micro-activity test unit, in which 16 g of the hydrocarbon oil desulfurization catalyst was loaded into a fixed-bed reactor having an inner diameter of 30 mm and a length of 1 m.

A catalytic cracking gasoline having a sulfur concentration of 780 ppm was used as the sulfur-containing hydrocarbon oil feedstock, and the desulfurization was conducted under the following conditions: a reaction pressure of 1.38 MPa, a hydrogen flow rate of 6.3 L/h, a gasoline flow rate of 80 mL/h, a reaction temperature of 410° C., and a weight hourly space velocity of 4 $h^{-1}$ for the hydrocarbon oil.

The desulfurization activity was evaluated in accordance with the sulfur content in the gasoline product. The sulfur content in the gasoline product was measured by the off-line chromatographic analysis method, using an instrument of model GC6890-SCD from Agilent company.

To provide an accurate characterization of the activity of the hydrocarbon oil desulfurization catalyst in practical industrial operations, several runs of desulfurization evaluation experiments were carried out for each catalyst, in which the catalyst was regenerated at a temperature of 550° C. under an air atmosphere after the completion of each run of the desulfurization evaluation experiment, and then reused in the next run of desulfurization evaluation experiment, until the activity of the catalyst became essentially stable after 6 cycles of reaction and regeneration, and then the sulfur content of the stabilized gasoline product obtained in the desulfurization evaluation experiment after the sixth cycle of reaction and regeneration was used to represent the activity of the catalyst. The sulfur content of the stabilized gasoline product and the yield of the liquid product are shown in Table 2.

Breakthrough sulfur capacities for hydrocarbon oil desulfurization of the hydrocarbon oil desulfurization catalysts A1-A14 and B1-B5 were determined and provided in Table 4. In particular, a desulfurization reaction was carried out using the hydrocarbon oil desulfurization catalyst to be evaluated under the conditions as described about for the evaluation of the desulfurization performance, till the sulfur content in the hydrocarbon oil product obtained reached 10 μg/g or more. At this point, the hydrocarbon oil desulfurization catalyst was deemed to have encountered a breakthrough, and the amount of the accumulated sulfur adsorbed on the hydrocarbon oil desulfurization catalyst, relative to the total weight of the catalyst, was measured and recorded as its breakthrough sulfur capacity.

The motor octane number (MON) and research octane number (RON) of the gasoline feedstock before reaction and the gasoline product obtained after the sixth cycle were measured, respectively, in accordance with GB/T 503-1995 and GB/T 5487-1995, and the difference between the results obtained for the gasoline feedstock and the gasoline product were calculated and provided in Table 2.

TABLE 2

Evaluation results of the hydrocarbon oil desulfurization catalysts

| No. | Abrasion index of the catalyst | Gasoline product | | | | |
|---|---|---|---|---|---|---|
| | | Sulfur content/ppm | Yield/% | ΔMON | ΔRON | Δ(RON + MON)/2 |
| A1 | 2.2 | 5 | 99.8 | −0.40 | −0.30 | −0.35 |
| A2 | 2.8 | 5 | 99.9 | −0.45 | −0.35 | −0.40 |
| A3 | 2.6 | 8 | 99.8 | −0.45 | −0.40 | −0.43 |
| A4 | 2.6 | 7 | 99.7 | −0.45 | −0.40 | −0.43 |
| A5 | 2.2 | 5 | 99.8 | −0.40 | −0.30 | −0.35 |
| A6 | 2.8 | 5 | 99.9 | −0.45 | −0.35 | −0.40 |
| A7 | 2.6 | 8 | 99.8 | −0.45 | −0.40 | −0.43 |
| A8 | 2.6 | 7 | 99.7 | −0.45 | −0.40 | −0.43 |
| A9 | 2.5 | 7 | 99.8 | −0.40 | −0.42 | −0.41 |
| A10 | 2.7 | 8 | 99.7 | −0.46 | −0.40 | −0.43 |
| A11 | 2.4 | 5 | 99.8 | −0.45 | −0.40 | −0.43 |
| A12 | 2.5 | 6 | 99.7 | −0.45 | −0.40 | −0.43 |
| A13 | 2.5 | 7 | 99.8 | −0.40 | −0.42 | −0.41 |
| A14 | 2.6 | 7 | 99.7 | −0.46 | −0.40 | −0.43 |
| B1 | 7.0 | 10 | 99.6 | −0.50 | −0.45 | −0.48 |
| B2 | 7.8 | 9 | 99.5 | −0.58 | −0.50 | −0.54 |
| B3 | 7.4 | 8 | 99.5 | −0.45 | −0.45 | −0.45 |
| B4 | 7.4 | 7 | 99.5 | −0.55 | −0.50 | −0.53 |
| B5 | 7.8 | 8 | 99.5 | −0.50 | −0.45 | −0.48 |

Notes:
1. the gasoline feedstock had a sulfur content of 780 ppm, a RON of 93.0, and a MON of 82.7;
2. ΔMON denotes the difference between the MON of the product and that of the feedstock, with a positive value indicating an increase and a negative value indicating a decrease;
3. ΔRON denotes the difference between the RON of the product and that of the feedstock, with a positive value indicating an increase and a negative value indicating a decrease;
4. Δ(RON + MON)/2 denotes the difference between the antiknock index of the product and that of the feedstock, with a positive value indicating an increase and a negative value indicating a decrease.

As can be seen from the results shown in Table 2, the hydrocarbon oil desulfurization catalysts according to the present invention comprising the vanadium carbide component provided an effective reduction of the sulfur content of gasoline, even after a plurality of cycles of desulfurization and regeneration, indicating an increased desulfurization activity and an improved stability of activity. Moreover, the hydrocarbon oil desulfurization catalysts according to the present invention had lower abrasion indexes, indicating a better abrasion strength, and thus would have a longer service life. The hydrocarbon oil desulfurization catalyst of Comparative Example 5 comprised ordered porous silicon carbonitride, rather than the vanadium carbide used in the present invention, and thus had a much higher abrasion index as compared to the catalysts prepared according to the inventive Examples, indicating that the hydrocarbon oil desulfurization catalysts according to the present invention could provide better abrasion performance. In addition, compared with the gasoline products obtained using the hydrocarbon oil desulfurization catalysts according to the comparative examples, the gasoline products obtained using the hydrocarbon oil desulfurization catalysts according to the present invention showed relatively improved cotance numbers.

Example 16: Aging Test for the Desulfurization Catalyst for Hydrocarbon Oils

The hydrocarbon oil desulfurization catalysts A1-A14 and B1-B5 were aged for 16 h under an atmosphere with a steam partial pressure of 20 kPa at a temperature of 600° C.

XRD spectrum analysis was conducted on the catalysts A1 and B1 before and after aging. The XRD spectrums of the catalyst A1 obtained before and after the hydrothermal aging are shown in FIG. 1, in which both the fresh catalyst and the aged catalyst show crystalline phase peaks of vanadium carbide at 2θ=37.3°, 43.36° and 63.10°; while the XRD spectrums of the catalyst B1 obtained before and after the hydrothermal aging are shown in FIG. 2.

Figure 2:
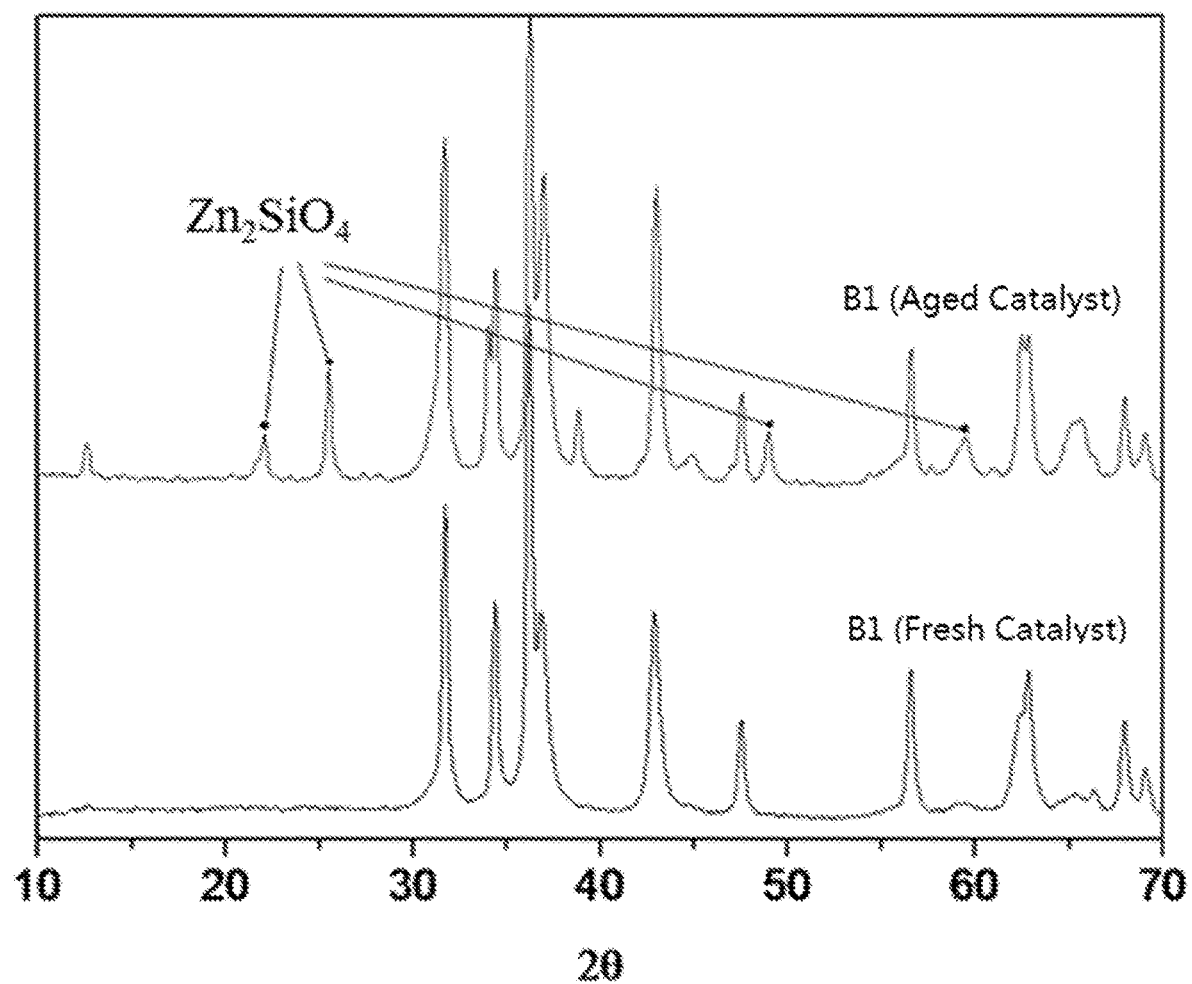
FIG. 2 shows XRD spectrums obtained before and after hydrothermal aging of the hydrocarbon oil desulfurization catalyst B1 produced in Comparative Example 1.

In FIG. 1, the XRD spectrum of the catalyst A1 obtained after the hydrothermal aging does not show the characteristic peaks of zinc silicate at 2θ=22.0°, 25.54°, 48.9° and 59.4°; while in FIG. 2, the XRD spectrum of the catalyst B1 obtained after the hydrothermal aging shows the aforementioned characteristic peaks of zinc silicate. Zinc silicate contents of the catalysts A1-A14 and B1-B5 shown in the XRD spectrums were determined using the method as described in Q/SH 3360 215-2009, an enterprise standard of SINOPEC Research Institute of Petroleum Processing (RIPP), and provided in Table 3.

In particular, the determination was conducted using a method comprising the following steps:

1. grounding an adsorbent sample to a size with a mesh number of 200 or less, and conducting a test under the following conditions: a x-ray diffractometer, Model TTR3, from Rigaku Corporation, Japan; CuKα radiation, scintillation detector, 40 KV, 250 mA, a receiving slit (RS) of 0.3 mm, a divergence slit (DS) of 1°, an antiscattering slit (SS) of 1°, a scanning range of 10° to 80°, a step width of 0.02°, a scanning velocity of 3 seconds/step, and a graphite monochromator.

2. collecting the spectrums, determining the main phases using the automatic search function of Jade 7.0 software in combination with a manual search, and inquiring, using ICSD database, the phase(s) whose structure could not be obtained directly.

3. conducting a standardless quantitative phase analysis using the inbuilt Rietveld whole pattern fitting (WPF) method of the Jade 7.0 software, in accordance with the operation manual of Jade 7.0, with a manual subtraction of the background, and generally with a R factor of less than 15%.

The desulfurization performance of the catalysts A1-A14 and B1-B5 after aging was evaluated using the same method as described in Example 15, with the results being provided in Table 3.

The flow rates of the gases fed to and discharged from the reactions performed with the catalysts A1-A14 and B1-B5 under a hydrogen atmosphere were measured, and the hydrogen concentrations in the gases were analyzed using a thermal conductance hydrogen analyzer of model QRD-1102A. The amount of the hydrogen added (Q1) and the amount of the hydrogen discharged (Q2) were determined, and then the difference between those two amounts was calculated and provided in Table 3.

Breakthrough sulfur capacities for desulfurization of hydrocarbon oil of the hydrocarbon oil desulfurization catalysts A1-A14 and B1-B5 after aging were determined and provided in Table 4.

TABLE 3

Evaluation results of the hydrocarbon oil desulfurization catalysts after aging

| No. | Zinc silicate content in the catalyst/ wt % | Gasoline product | | | | | Difference of hydrogen amount g/kg |
|---|---|---|---|---|---|---|---|
| | | Sulfur content/ ppm | Yield/% | ΔMON | ΔRON | Δ(RON + MON)/2 | |
| A1 | 0 | 6 | 99.8 | −0.38 | −0.35 | −0.37 | 4.5 |
| A2 | 0 | 6 | 99.8 | −0.42 | −0.44 | −0.43 | 4 |
| A3 | 0 | 8 | 99.9 | −0.48 | −0.40 | −0.44 | 3 |
| A4 | 0 | 8 | 99.8 | −0.46 | −0.40 | −0.43 | 2.5 |
| A5 | 0 | 6 | 99.8 | −0.38 | −0.35 | −0.37 | 4.2 |
| A6 | 0 | 6 | 99.8 | −0.38 | −0.44 | −0.41 | 4.0 |
| A7 | 0 | 8 | 99.9 | −0.48 | −0.40 | −0.44 | 3.0 |
| A8 | 0 | 7 | 99.9 | −0.50 | −0.40 | −0.45 | 3.2 |
| A9 | 0 | 8 | 99.8 | −0.48 | −0.40 | −0.44 | 2.8 |
| A10 | 0 | 8 | 99.8 | −0.38 | −0.45 | −0.42 | 4.0 |
| A11 | 0 | 6 | 99.9 | −0.36 | −0.30 | −0.33 | 3.0 |
| A12 | 0 | 6 | 99.9 | −0.46 | −0.40 | −0.43 | 2.5 |
| A13 | 0 | 8 | 99.8 | −0.40 | −0.35 | −0.38 | 3.5 |
| A14 | 0 | 7 | 99.8 | −0.40 | −0.35 | −0.38 | 3.6 |
| B1 | 23.4 | 50 | 99.7 | −0.58 | −0.50 | −0.54 | −2.6 |
| B2 | 18.6 | 36 | 99.8 | −0.58 | −0.52 | −0.55 | −2.6 |
| B3 | 19.2 | 44 | 99.7 | −0.45 | −0.45 | −0.45 | −2.1 |
| B4 | 20.1 | 44 | 99.7 | −0.55 | −0.50 | −0.53 | −1.8 |
| B5 | 0 | 14 | 99.7 | −0.55 | −0.48 | −0.52 | −2.3 |

Notes:
1. the gasoline feedstock had a sulfur content of 780 ppm, a RON of 93.0, and a MON of 82.7;
2. ΔMON denotes the difference between the MON of the product and that of the feedstock, with a positive value indicating an increase and a negative value indicating a decrease;
3. ΔRON denotes the difference between the RON of the product and that of the feedstock, with a positive value indicating an increase and a negative value indicating a decrease;
4. Δ(RON + MON)/2 denotes the difference between the antiknock index of the product and that of the feedstock, with a positive value indicating an increase and a negative value indicating a decrease;
5. the difference of hydrogen amount denotes the difference between the amount of the hydrogen added (Q1) and the amount of the hydrogen discharged (Q2) per 1 kg of hydrocarbon oil, with a positive value indicating a generation of hydrogen and a negative value indicating a consumption of hydrogen.

TABLE 4

Breakthrough sulfur capacities of the hydrocarbon oil desulfurization catalysts before and after aging

| No. | Before aging Breakthrough sulfur capacity/% | After aging Breakthrough sulfur capacity/% |
|---|---|---|
| A1 | 9.2 | 9.3 |
| A2 | 9.2 | 9.2 |
| A3 | 8.8 | 8.9 |
| A4 | 9.1 | 9.0 |
| A5 | 9.2 | 9.3 |
| A6 | 9.0 | 9.1 |
| A7 | 8.9 | 8.8 |
| A8 | 9.1 | 8.9 |
| A9 | 8.9 | 8.7 |
| A10 | 8.8 | 8.8 |
| A11 | 9.1 | 9.1 |
| A12 | 9.0 | 9.0 |
| A13 | 9.1 | 9.0 |
| A14 | 8.9 | 8.8 |
| B1 | 8.8 | 3.2 |
| B2 | 8.7 | 3.6 |
| B3 | 8.8 | 3.5 |

TABLE 4-continued

Breakthrough sulfur capacities of the hydrocarbon oil desulfurization catalysts before and after aging

| No. | Before aging Breakthrough sulfur capacity/% | After aging Breakthrough sulfur capacity/% |
|---|---|---|
| B4 | 8.8 | 3.3 |
| B5 | 8.6 | 3.1 |

As can be seen from the results in Table 3, after the aging process, no zinc silicate was generated in the hydrocarbon oil desulfurization catalysts obtained in the inventive Examples 1-14. In contrast, in the catalysts of Comparative Examples 1-4, zinc silicate was generated due to the reaction of zinc oxide with silica-containing materials, and thus the desulfurization activity of the catalysts was decreased.

It can also be seen from the data of the gasoline products in Tables 2 and 3 that gasoline products could still be produced with a high yield using the catalyst and the desulfurization process according to the present invention, and compared with the gasoline products obtained using the catalysts of the comparative examples, the gasoline products obtained using the catalysts according to the present invention showed relatively improved octane numbers.

In addition, it can be seen from the results in Table 3 that the hydrogen amount was increased during the reaction under a hydrogen atmosphere for catalysts A1-A14, while the hydrogen amount was decreased during the reaction for catalysts B1-B5. Thus, it can be seen that, when a hydrocarbon oil desulfurization catalyst according to the present invention was used, hydrogen consumption of the catalytic hydrogenation absorption desulfurization process can be greatly reduced, thereby saving the operation cost for desulfurization of hydrocarbon oils.

As shown in Table 4, the breakthrough sulfur capacities, determined before aging, of the hydrocarbon oil desulfurization catalysts according to the present invention are similar to those of the hydrocarbon oil desulfurization catalysts obtained in the comparative examples. After the aging process, as no zinc silicate was generated in the hydrocarbon oil desulfurization catalysts according to the inventive Examples 1-14, the breakthrough sulfur capacities of the catalysts remained about the same; in contrast, as to the catalysts obtained in the Comparative Examples 1-4, the breakthrough sulfur capacities decreased significantly due to the zinc silicate generating reaction between zinc oxide and the silica-containing material, and as a result the desulfurization activities of the catalysts decreased significantly as well.

As to the Comparative Example 5, though the generation of zinc silicate was avoided by using ordered porous silicon carbonitride, the use of said ordered porous silicon carbonitride in adsorbents has an obvious defect in abrasion performance due to the porosity of such a material. For example, as shown in Table 2, the abrasion index of the catalyst B5 is as high as 7.8. Therefore, after the hydrothermal aging, though the content of zinc silicate in the catalyst B5 was zero, the breakthrough sulfur capacity of said catalyst decreased significantly due to the poor abrasion resistance thereof.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It is to be appreciated that certain features are, for clarity, described herein in the context of separate embodiments, may also be provided in combination in a single embodiment. Conversely, various features that are, for brevity, described in the context of a single embodiment, may also be provided separately or in any sub-combination.

The invention claimed is:

1. A desulfurization catalyst for hydrocarbon oils, comprising a support and at least one metal promoter selected from the group consisting of cobalt, nickel, iron and manganese, wherein the support comprises (1) at least one metal oxide selected from the group consisting of oxides of Group IIB, Group VB and Group VIB metals, and (2) a refractory inorganic oxide, wherein the support further comprises at least about 5% by weight of vanadium carbide, based on a total weight of the desulfurization catalyst.

2. The desulfurization catalyst for hydrocarbon oils according to claim 1, wherein the desulfurization catalyst is substantially free of silica.

3. The desulfurization catalyst for hydrocarbon oils according to claim 1, wherein the desulfurization catalyst comprises:
   1) about 10-80% by weight of the metal oxide;
   2) about 3-35% by weight of the refractory inorganic oxide;
   3) about 5-40% by weight of the vanadium carbide; and
   4) about 5-30% by weight of the metal promoter,
   based on the total weight of the desulfurization catalyst.

4. The desulfurization catalyst for hydrocarbon oils according to claim 1, wherein the desulfurization catalyst comprises:
   1) about 40-60% by weight of the metal oxide;
   2) about 8-15% by weight of the refractory inorganic oxide;
   3) about 12-25% by weight of the vanadium carbide; and
   4) about 12-20% by weight of the metal promoter,
   based on the total weight of the desulfurization catalyst.

5. The desulfurization catalyst for hydrocarbon oils according to claim 1, wherein the metal oxide is at least one of zinc oxide, molybdenum oxide, and vanadium oxide.

6. The desulfurization catalyst for hydrocarbon oils according to claim 1, wherein the refractory inorganic oxide is at least one of alumina, titanium oxide, zirconium dioxide, and tin dioxide.

7. The desulfurization catalyst for hydrocarbon oils according to claim 1, wherein the vanadium carbide has a face-centered cubic crystal structure.

8. A process for preparing the desulfurization catalyst for hydrocarbon oils according to claim 1, comprising the steps of:
   (i) preparing a support comprising at least one metal oxide selected from the group consisting of oxides of Group JIB, Group VB, and Group VIB metals, a refractory inorganic oxide, and vanadium carbide, and
   (ii) loading on the support at least one metal promoter selected from the group consisting of cobalt, nickel, iron, and manganese.

9. The process according to claim 8, wherein the step (i) further comprises the steps of:
   (1a) combining vanadium carbide, a binder, water, and a liquid acid to form a slurry, and mixing the slurry with at least one metal oxide selected from the group consisting of oxides of Group JIB, Group VB, and Group VIB metals, to produce a support slurry; or (1b) combining a binder, water, and a liquid acid to form a slurry, and mixing the slurry with at least one metal oxide selected from the group consisting of oxides of Group IIB, Group VB, and Group VIB metals, and vanadium carbide, to produce a support slurry; and (2) subjecting the support slurry to shaping, drying, and calcination to produce a support.

10. The process according to claim 9, wherein the binder is at least one selected from the group consisting of an aluminium binder, a titanium binder, a zirconium binder, and a tin binder; the aluminium binder being at least one selected from the group consisting of alumina hydrate powder, hydrated alumina, aluminium sol, boehmite monohydrate, pseudo-boehmite monohydrate, alumina trihydrate, and amorphous aluminium hydroxide; the titanium binder being at least one selected from the group consisting of titanium tetrachloride, ethyl titanate, isopropyl titanate, titanium acetate, hydrous titanium oxide, and anatase-type titania; the zirconium binder being at least one selected from the group consisting of zirconium tetrachloride, zirconium oxychloride, zirconium acetate, hydrous zirconium oxide, and amorphous zirconium dioxide; and the tin binder being at least one selected from the group consisting of tin tetrachloride, tin tetra-isopropoxide, tin acetate, hydrous tin oxide, and tin dioxide.

11. The process according to claim 9, wherein the support slurry has a pH of about 1-5, and the liquid acid is an acid or an aqueous solution of an acid, and wherein the acid is selected from the group consisting of water soluble inorganic acids, organic acids, and mixtures thereof.

12. The process according to claim 8, wherein step (ii) further comprises the steps of:

(3) incorporating a precursor of the metal promoter into the support, followed by drying and calcination to produce a catalyst precursor; and (4) reducing the catalyst precursor under a hydrogen-containing atmosphere, to produce the desulfurization catalyst for hydrocarbon oils.

13. The process according to claim 12, wherein the precursor of the metal promoter is at least one selected from the group consisting of acetates, carbonates, nitrates, sulfates, thiocyanates, and oxides of the metal promoter.

14. The process according to claim 8, wherein vanadium carbide has a face-centered cubic crystal structure.

15. The process according to claim 8, wherein the vanadium carbide has a particle size of about 2-30 μm and the vanadium carbide particles have a specific surface area of from about 10 $m^2/g$ to 50 $m^2/g$.

16. A desulfurization catalyst for hydrocarbon oils produced by the process according to claim 8.

17. A method for the desulfurization of sulfur-containing hydrocarbon oils, comprising the step of contacting a sulfur-containing hydrocarbon oil with a desulfurization catalyst for hydrocarbon oils according to claim 1 in the presence of hydrogen.

18. The method according to claim 17, wherein the contacting is carried out at a temperature of about 350-500° C. under a pressure of about 0.5-4 MPa.

* * * * *